(12) United States Patent
Dempsey

(10) Patent No.: US 6,601,014 B1
(45) Date of Patent: Jul. 29, 2003

(54) DYNAMIC DEVIATION

(75) Inventor: Derek M. Dempsey, West Norwood (GB)

(73) Assignee: Cerebrus Solutions Ltd., Harlow (GB)

( * ) Notice: Subject to any disclaimer, the term of this patent is extended or adjusted under 35 U.S.C. 154(b) by 0 days.

(21) Appl. No.: 09/451,125

(22) Filed: Nov. 30, 1999

(51) Int. Cl.$^7$ ............................................... H04Q 7/00
(52) U.S. Cl. ........................ 702/179; 702/57; 702/66; 702/108; 702/117; 702/182; 702/189
(58) Field of Search ................ 702/57–59, 66, 702/69, 78, 79, 108, 117, 118, 122, 124, 179, 182–189, 194, 198, 98; 455/405, 410; 379/29.09, 88.04, 112.04, 112.06, 114.14, 121.04, 189; 705/1, 7, 35, 38, 42, 44

(56) References Cited

U.S. PATENT DOCUMENTS

| | | | | |
|---|---|---|---|---|
| 5,345,595 A | * | 9/1994 | Johnson et al. | 379/189 |
| 5,615,408 A | * | 3/1997 | Johnson et al. | 455/405 |
| 5,819,226 A | * | 10/1998 | Gopinathan et al. | 705/44 |
| 5,872,844 A | * | 2/1999 | Yacobi | 705/39 |
| 6,018,723 A | * | 1/2000 | Siegel et al. | 705/38 |
| 6,038,555 A | * | 3/2000 | Field et al. | 706/21 |
| 6,067,535 A | * | 5/2000 | Hobson et al. | 706/10 |
| 6,073,089 A | * | 6/2000 | Baker et al. | 702/185 |
| 6,112,079 A | * | 8/2000 | Lamb | 380/250 |
| 6,182,022 B1 | * | 1/2001 | Mayle et al. | 702/182 |
| 6,253,186 B1 | * | 6/2001 | Pendleton, Jr. | 705/1 |
| 6,330,546 B1 | * | 12/2001 | Gopinathan et al. | 705/1 |
| 2001/0054001 A1 | * | 12/2001 | Robinson | 705/14 |

FOREIGN PATENT DOCUMENTS

| | | | |
|---|---|---|---|
| WO | WO9905844 | | 2/1999 |
| WO | WO0030398 | | 5/2000 |
| WO | WO 00/30398 | * | 5/2000 |

OTHER PUBLICATIONS

Burge P, et al. "Fraud Detection and Management in Mobile Telecommunications Networks". European Conference on Security and Detection XP002085420, Paragraph 3, User Profiling.

* cited by examiner

Primary Examiner—Marc S. Hoff
Assistant Examiner—Carol S Tsai
(74) Attorney, Agent, or Firm—Kevin A. Oliver; Foley Hoag LLP

(57) ABSTRACT

A method and related apparatus and software of detecting anomalies in a stream of data values. The method comprises the steps of: receiving a data value on the stream of data; calculating a new weighted average responsive to the received data value, a previously stored weighted average associated with the stream of data, and a decay rate in the range of 0 to 1; and calculating a new measure of deviation from the new weighted average responsive to the new weighted average, the data value, a previously stored measure of deviation associated with the stream of data, and the decay rate.

19 Claims, 5 Drawing Sheets

DYNAMIC DEVIATION

FIELD OF THE INVENTION

The present invention relates to a method and apparatus for deriving a statistical measure of variation from a decaying mean, and in particular to their use in telecommunications and anomaly detection applications and a system incorporating the same.

BACKGROUND TO THE INVENTION

In recent years there has been a rapid increase in the number of commercially operated telecommunications networks in general and in particular wireless telecommunication networks. Associated with this proliferation of networks is a rise in fraudulent use of such networks the fraud typically taking the form of gaining illicit access to the network, and then using the network in such a way that the fraudulent user hopes subsequently to avoid paying for the resources used. This may for example involve misuse of a third party's account on the network so that the perpetrated fraud becomes apparent only when the third party is charged for resources which he did not use.

Since fraudulent use of single account can cost a network operator a large sum of money within a short space of time it is important that the operator be able to identify and deal with the most costly forms of fraud at the earliest possible time.

One of the steps employed in, but not limited to use in, such fraud detection systems in anomaly detection from event streams.

Pattern recognition for event streams can be achieved by building up profiles of the behaviour of an entity and performing anomaly detection over these profiles. Such profiles may contain statistical information including but not restricted to an average of event values (for example mean) and a measure of the statistical variation from that average (for example variance or standard deviation). It is then possible to compare a newly received event value with the average and a measure of the typical variation from that average and to decide on that basis whether the newly received event value is or is not anomalous. For example in a telephone network the event data may relate to the number of minutes of telephone calls made in a given period (for example one day). In the case of a domestic subscriber who typically makes an average of 10 minutes of calls per day, sudden call record data of 300 or 400 minutes in one day may be indicative not only of an anomaly but of fraudulent use of the telephone system. In such a case it may be appropriate to raise an alarm only where the recently received value lies more than some multiple of standard deviations from the mean. In practice it is impractical to retain all historic values of events. However given a situation where the mean, $\mu$, of n−1 values is known, then this measure can be updated given an additional data value, $v_n$, to give a new mean as defined in equation [1]. This provides an exact value for the new mean.

$$\mu_n = (1-1/n)\mu_{n-1} + (1/n)(V_n - \mu_{n-1}) \quad [1]$$

The calculation of the true statistical variance of the data cannot be made exactly however if the previous values are not retained. This is because all previous deviations from the mean must be recalculated when the mean changes and this cannot be done if previous values have not been retained. However, it is possible to derive approximations to the variance and estimations of the variance. A first approximation to the variance (S) can be made by updating the expression in a manner analogous to the mean update equation [1]. This method simply ignores the strict necessity to recompute all values and treats the previous deviation measure as though it were a mean deviation. This can then be updated using the equation [2].

$$S_n = (1-1/n)S_{n-1} + (1/n)(V_n - \mu_{n-1})^2 \quad [2]$$

An alternative approximation which includes a correction for the recalculation of the previous variance is defined in equation [3]. This is a known equation for variance estimation that is used for time series data. This provides a closer approximation to the true variance in the case where n is known.

$$S_n = (1-1/n)S_{n-1} + (1/n - 1n^{/2})(V_n - \mu_{n-1})^2$$

The field of variance estimation has been extensively studied. The technique of Kalman Filtering, widely used in the analysis of time series data, employs a similar method for co-variance estimation.

A disadvantage of using the conventional statistical averages and measures of variance such as mean and standard deviation is that all input data values have equal influence on the resulting measures. In situations where the event data may be locally stable but vary significantly over longer time scales (e.g. telephone account usage patterns), it is undesirable that older data values relating to prior (pseudo-)stable states should retain equal influence in measures to be applied to the current (pseudo-)stable state.

This can be dealt with for conventional statistical calculations by selecting a time period and calculating the mean and variance over the period specified. This period can then serve as a moving window for the calculation of statistical measures. However, this method requires that all data values be stored for accurate updating and that a window of appropriate size can be determined. In order to provide a measure of variation that is usable for large multi-dimensional datasets an appropriate method of variance estimation based on the update formulae described must be found

OBJECT OF THE INVENTION

The invention seeks to provide an improved method and apparatus for deriving a statistical measure of variation from a decaying mean.

The invention also seeks to provide an improved method and apparatus for anomaly detection in data streams in general, and for anomaly detection in data streams relating to telecommunications account data in particular.

SUMMARY OF THE INVENTION

The invention provides an application of an adaptation of the calculation of standard deviation outlined below. It results in a specific mathematical formula for maintaining a sequential deviation measure. The method extends to allow for calculation of deviation to be itself decayed where no events of a given type occur in the event stream. This is the same as zero value events occurring and a formula that provides an approximate calculation for this is also provided.

According to a first aspect of the present invention there is provided a method of detecting anomalies in a stream of data values comprising the steps of: receiving a data value on said stream of data; calculating a new weighted average responsive to said data value, a previously stored weighted average associated with said stream of data, and a decay rate in the range of 0 to 1; and calculating a new measure of deviation from said new weighted average responsive to said new weighted average, said data value, a previously stored measure of deviation associated with said stream of data, and said decay rate; storing said new weighted average and said new measure of deviation.

In one preferred embodiment the method additionally comprises the steps of: determining an anomaly threshold responsive to said previously stored weighted average and a previously stored measure of deviation; deciding whether said data value is anomalous responsive to a comparison between said data value and said anomaly threshold Preferably, said anomaly threshold is a sum of said previously stored weighted average and a multiple of said previously stored measure of deviation therefrom.

Preferably, said multiple is in the range 2 to 10.

Preferably, said new weighted average is a sum of a product of said decay rate and said previously stored weighted average and a product of one minus said decay rate and said data value.

In a preferred embodiment, said new weighted average is d.v+(1−d) h wherein d is said decay rate, v is said data value, and h is said previously stored weighted average.

In one preferred embodiment, said decay rate has a half-life and said measure of deviation is calculated responsive to an approximation to said half-life.

Preferably, said half-life is determined by $(1-d)^\lambda = 0.5$ wherein d is said decay rate.

Preferably, said new measure of deviation is $$DV + \left( \frac{(v-h)^2 - DV}{2 \cdot \lambda} \right)$$

wherein
DV is said previously stored measure of deviation, v is said value, h is said new weighted average, and λ is said half life.

In one preferred embodiment said decay rate is less than 0.1.

In a preferred embodiment, said data value relates to subscriber account usage.

In a preferred embodiment, an anomalous data value is indicative of account usage fraud.

In a preferred embodiment, said subscriber account is a telecommunications network subscriber account.

In a preferred embodiment, said telecommunications network is a wireless network.

In one preferred embodiment, successive data values relate to uniform-length time periods.

In a further preferred embodiment, successive data values relate to non-uniform-length time periods.

Preferably said new weighed average and said new measure of deviation are calculated responsive to a measure of a time period associated with said data value Advantageously, the method gives better tracking of slow changes in behaviour over time than does the standard measures of mean and standard deviation.

Advantageously, the method minimises calculation steps involved at each stage and obviates storing all past values for calculating the profile value.

According to a further aspect of the present invention there is provided a system for detecting anomalies in a stream of data values, comprising: a processor arranged to receive a data value from said stream of data values; to calculate a new weighted average responsive to said data value, a previously stored weighted average associated with said stream of data, and a decay rate in the range 0 to 1; and to calculate a new measure of deviation from said new weighted average responsive to said new weighted average, said data value, a previously stored measure of deviation associated with said streams of data, and said decay rate; and a storage device upon which to store said previously stored weighted averaged and said previously stored measure of deviation.

The present invention also provides for a telecommunications system comprising such a system for anomaly detection. In a particularly appropriate arrangement, the telecommunications system is a wireless telecommunications system.

The invention also provides for a system for the purposes of digital signal processing which comprises one or more instances of apparatus embodying the present invention, together with other additional apparatus.

The invention also provides for a program for a computer on a machine-readable medium arranged to perform the steps of the method in any of its embodiments.

In particular, there is provided a program for a computer on a machine-readable medium arranged to perform the steps of: receiving a data value on said stream of data; calculating a new weighted average responsive to said data value, a previously stored weighted average associated with said stream of data, and a decay rate in the range of 0 to 1; and calculating a new measure of deviation from said new weighted average responsive to said new weighted average, said data value, a previously stored measure of deviation associated with said stream of data, and said decay rate.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
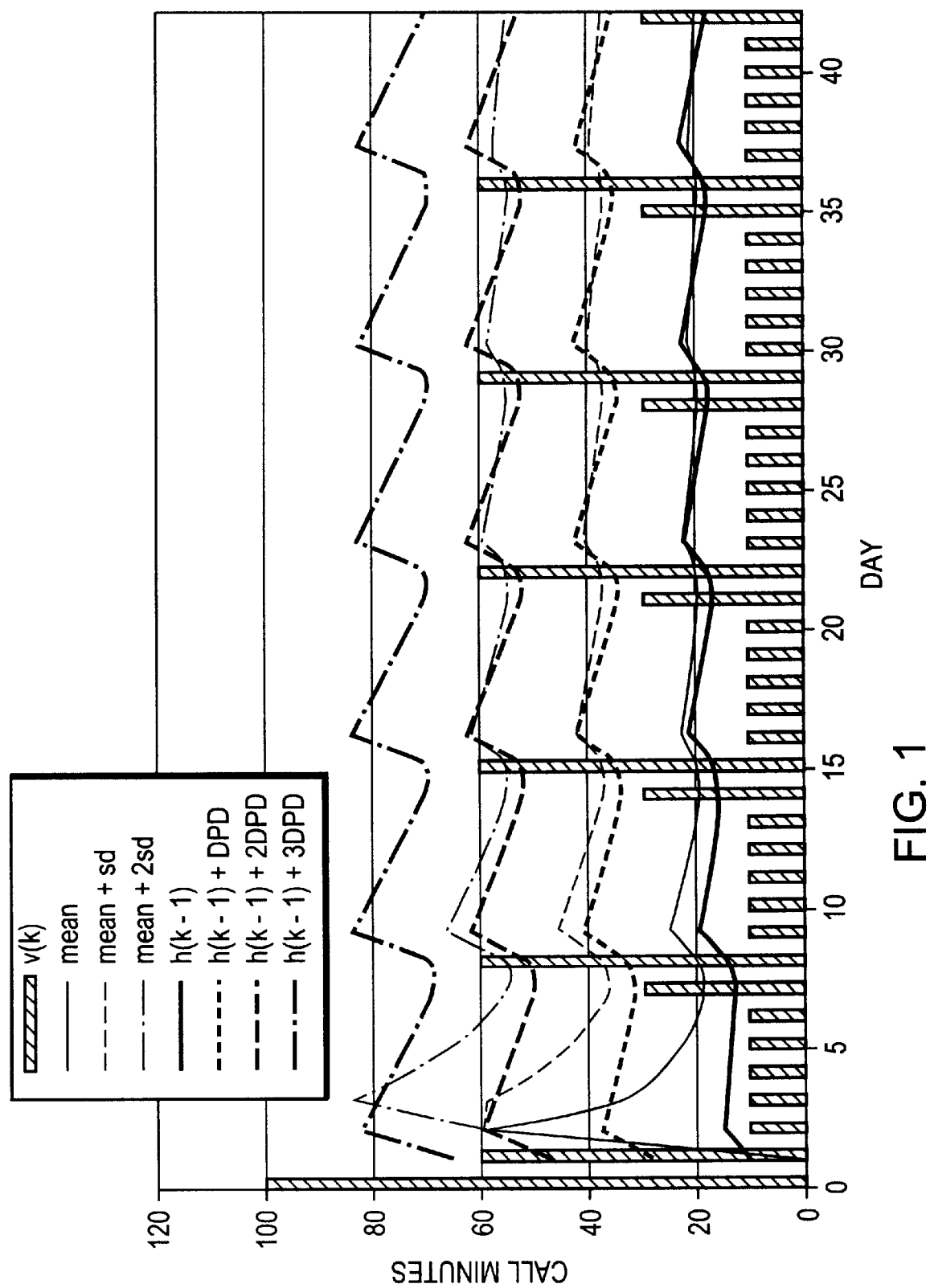
FIG. 1 shows a first example of a decay path of a historic profile according to the present invention.

The invention is now described by way of example in the context of anomaly (fraud) detection in telecommunications account data. However, as will be apparent to the skilled reader, the scope of application of the method described extends to many more application areas. Referring now to FIG. 1, there is shown a series of data values, v(k), representative of the number of minutes of call time used by a mobile telephone subscriber over successive days. For simplicity in this example a simple recurring call pattern is shown with 10 minutes call time on week days, 30 minutes on Saturdays, and 60 minutes on Sundays. The graph is overlaid with an indication of the values associated with the mean, mean plus one standard deviation, and mean plus two standard deviations. The graphs for these statistical measures has been offset one period to the right so as more clearly to indicate the actual statistical values associated with past data with which each successive new item of data, v(k), would be compared in practice. The figure also shows the corresponding graph for an historic profile value, h(k−1), which is a measure of typical data value derived from past account data but biased towards more recent values. The historic profile value (or dynamic mean) is a weighted average formed by decay and determined by equation [3], $$h(k)=d.v(k)+(1-d).h(k-1) \qquad [3]$$

in which h(k) is the historic profile value associated with data values up to and including the k period, (where k>0), v(k) is the data value associated with the k time period, and d is the decay rate.

As new data values are received, each older value retains progressively less influence on the new profile value. Whilst this influence never entirely disappears, its decay is exponential so that after some time its influence becomes negligible.

The choice of an initial historic profile value, h(0) depends upon the information available. In the example shown in FIG. 1, an initial value h(0)=10 has been used.

The graphs shown in FIG. 1 are based on a decay rate of 0.1. In practice lower decay rates (for example in the order of 0.03) may be more appropriate, but the use of d=0.1 in the present example exaggerates the graphs for explanatory purposes.

The recurrence relation [3] for h(k) is equivalent to the direct formulation shown in equation [4].

$$h(k) = (1-d)^k h(0) + \sum_{n=1}^{k} d \cdot (1-d)^{n-k} \cdot v(n) \qquad [4]$$

For any given data value, v(k), its initial contribution to the historic profile value is determined by the decay rate, d, and its subsequent influence decayed at a rate of (1−d). After a number of periods the remaining influence of the given data value will be half its original influence. The number of periods corresponding to this decline in influence is the half-life, $\lambda$, of the decay rate d.

Figure 2:
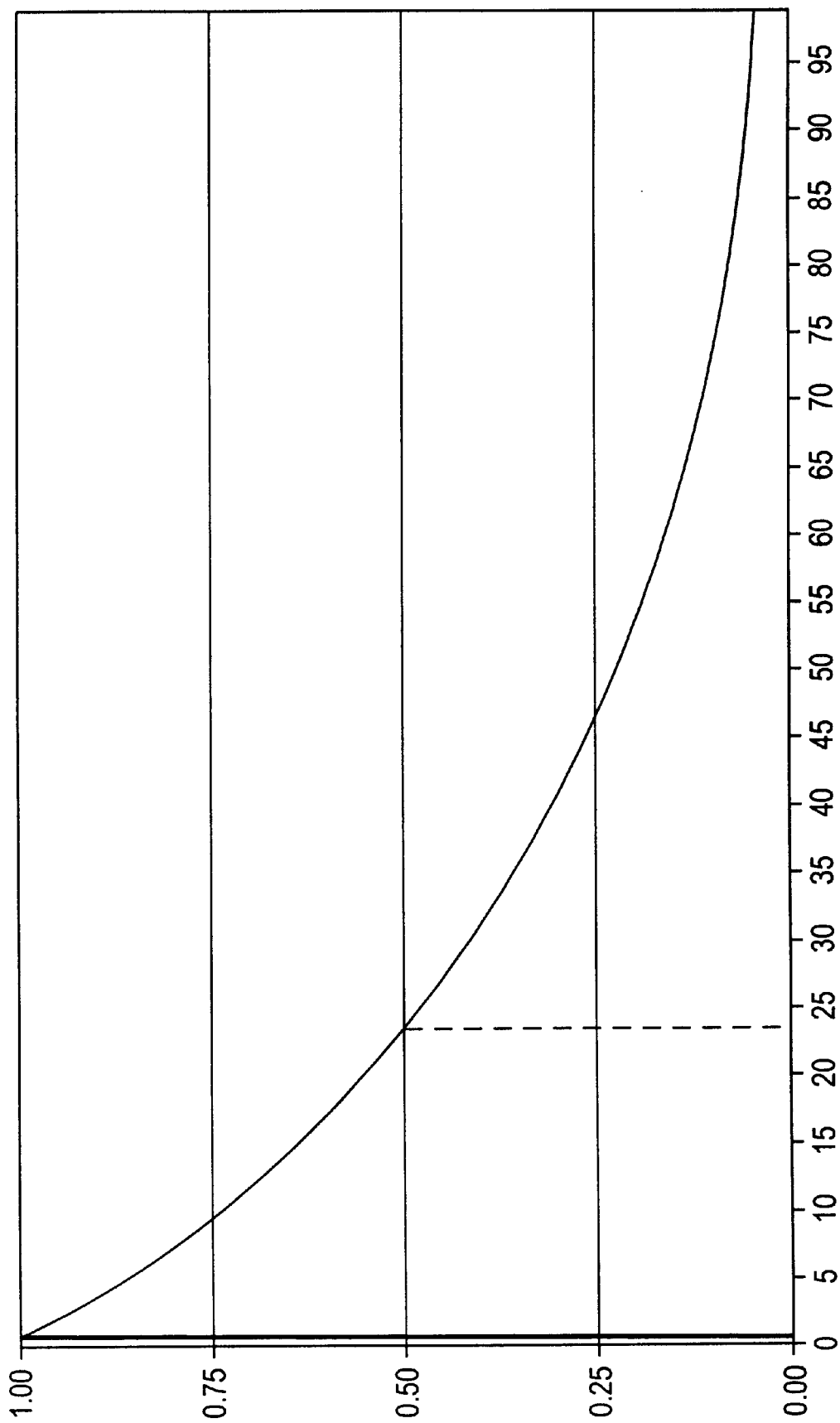
FIG. 2 shows the decay rate and half-life of a single data value within a historic profile according to the present invention.

FIG. 2 shows an example of the decay rate of a data value for a decay rate of 0.03. This gives a half-life of 23 (to two significant figures) periods. A decay rate of 0.1 as used in FIG. 1 has a half-life of 14. The calculation of the half-life, $\lambda$, is straightforward and determined by equation [5].

$$(1-d)^\lambda=0.5 \qquad [5]$$

This formulation is based on the assumption that each period is representative of the same length of time, or is considered as having equal rating. A more complicated formulation is required for periods of differing length.

For purposes of calculating a measure of variation with respect to the historic profile value, a value derived from the half-life may be used. It has been found that a value of twice the half-life is a practical approximation to the number of data values which contribute significantly to the current value of the historic profile. For data incorporated in the historic profile value before twice the half-life ago, the contribution of a value can be considered to be negligible. So for example a decay rate of 0.03 gives a half-life of 23 periods which would yield a value of 46 as an approximation to the number of periods which form the basis of the historic profile value. Data first incorporated before that time would have at most a quarter of its original influence.

Given an historic profile value and the approximation to the number of data values which significantly influence that historic profile value, it is possible to calculate a measure of the variance of the data over time, based on the conventional statistical variance or standard deviation. The value of this variance, the Dynamic Variance, DV(k), is determined by equation [6].

$$DV(k+1) = DV(k) + \left( \frac{(v(k)-h(k))^2 - DV(k)}{n} \right) \qquad [6]$$

in which n is an approximation to the number of data values (e.g. twice the half-life, $\lambda$, having a significant influence on the current historic profile, h(k).

The Dynamic Deviation (DD) value, DD(k), is then the square route of the Dynamic Variance as defined in equation [7].

$$DD(k)=\sqrt{DV(k)} \qquad [7]$$

Referring again to FIG. 1, there is also shown graphical representations of the evolving value of the historic profile h(k) along with indications of the corresponding boundaries associated with 1, 2, and 3 DD's away from the historic profile value.

Figure 3:
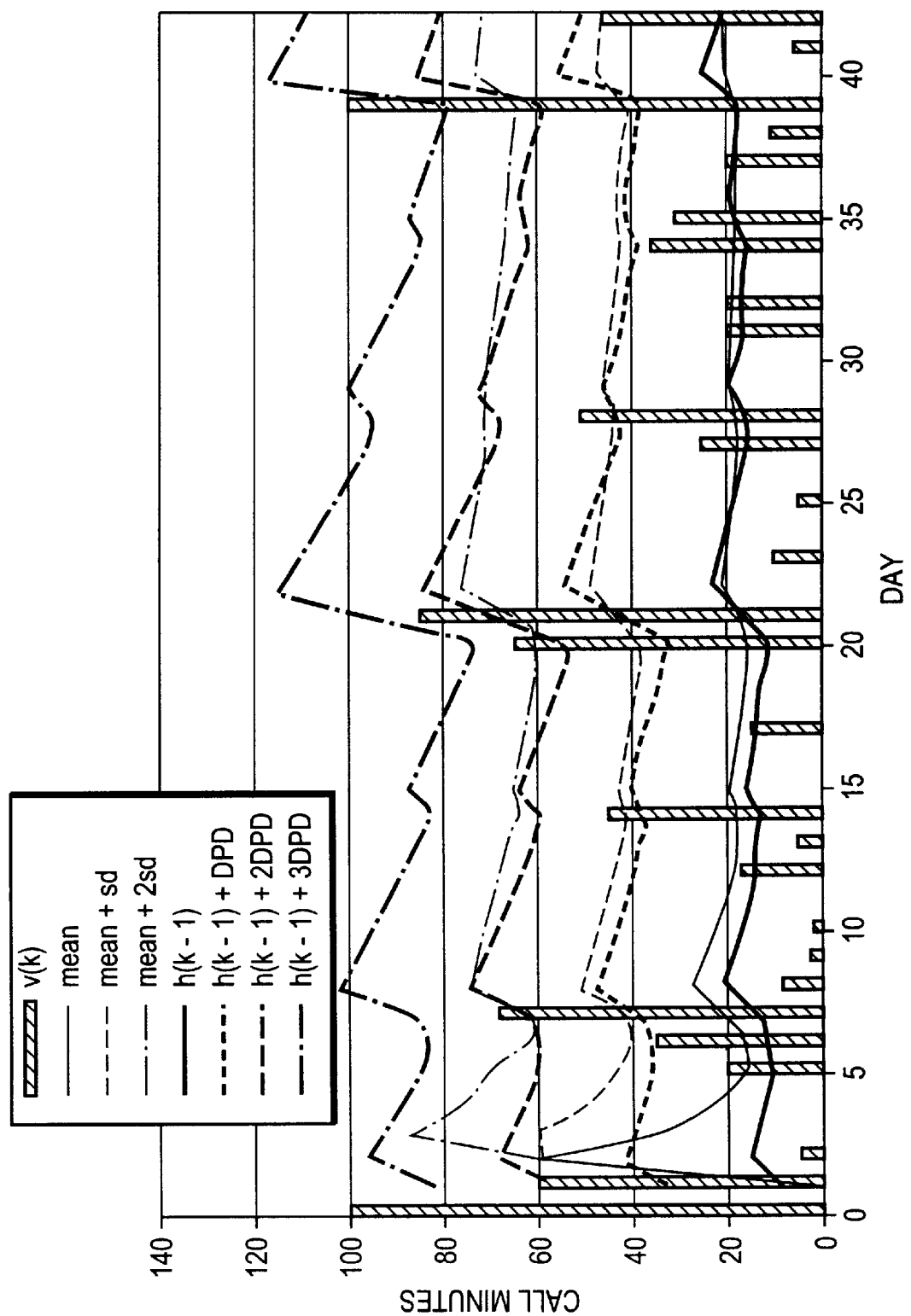
FIG. 3 shows a second example of a historic profile and data profile deviation according to the present invention.

FIG. 3 shows a second example of how the historic profile value and associated DD values vary, in this case associated with a more realistic irregular data series.

Figure 4:
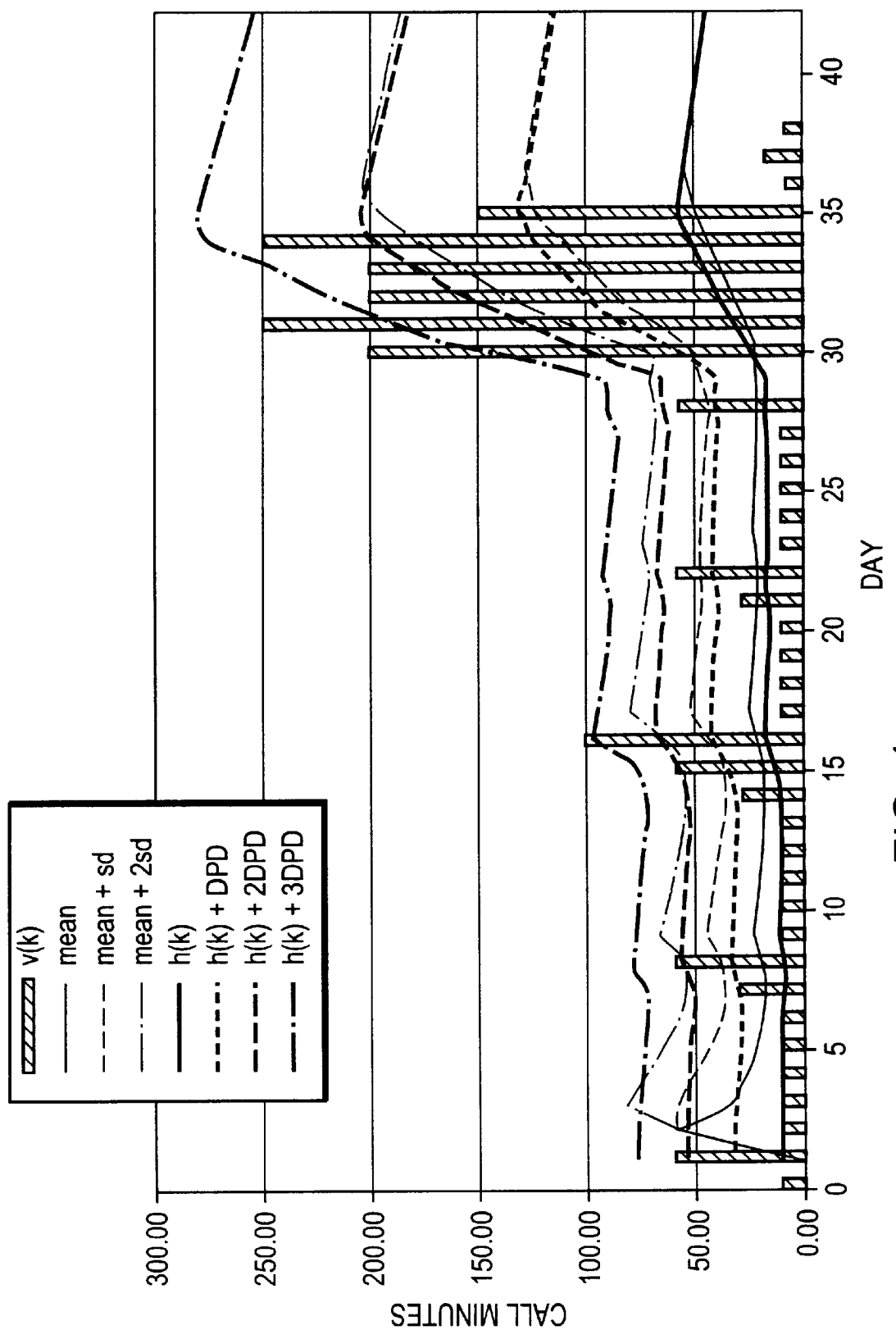
FIG. 4 shows a third example of a historic profile and data profile deviation according to the present invention.

FIG. 4 shows a further example, this time illustrating the effect of a sudden change in call pattern at the 30$^{th}$ time interval. Such a sudden change in call pattern leads to values outside a range of three deviations from the mean and, were this set as the threshold for identifying anomalies, an alarm would be raised.

One advantage of the method is that there is no need to store past data values, thereby saving memory, and the method provides a method of decaying values to form an historically typical value into the calculation of typical variation. In other words, the method of decay allows an adaptive measure of average or typical value to be maintained that is different from the arithmetic mean. This method of decay allows an adaptive calculation of average or typical variation to be maintained. In addition, the invention outlines a method of measurement for such decayed averages that provides a coherent measurement of the number of values represented in such a decayed average.

An estimate for the initial value of the variance needs to be made. This can be done based on past data if available, or standard values can be used for initialisation. Once the process of updating DD values begins the values will fairly quickly approach the true DD.

Each Usage Period would require a DD profile in addition to the Recent and Historic profile, thus increasing the storage requirements by 50%. However, this represents absolute minimum storage required to maintain any deviation monitor. It is a significant benefit of the invention that it allows deviations to be calculated and maintained with the minimum storage.

Inactivity for one or more time periods maybe catered for by decaying. The historical profile at the next active period with each intervening period counting. Thus the figure for typical value reduces during periods of inactivity. This in intuitively correct since inactivity corresponds to values of zero and these should be included in assessment of typical value over a period. However, there may be circumstances where such null values are not counted and this adjustment for inactivity is not essential. The method does include a means for adjustment of the historic value due to periods of inactivity. A count of the number of periods of inactivity is maintained. The historic profile can be updated using this formula:

$$h(k)=d.v(k)+(1-d)^{1+inactive}.h(k-1) \quad [8]$$

where inactive=number of inactive periods.

This formula is generated from the standard update formula [3] by assuming the value v=0 for each inactive period.

It is not obvious whether the DD should be affected similarly. However, it is logical to assume a similar behaviour and therefore a method for similarly revising the DD is also presented. It is certainly assumed that this method will not be adopted in all circumstances but is essential for a complete account of the invention.

The null value will have the effect of bringing the DD closer to the value of the historic value, since effectively the deviation from the historic value is equal to this value for null or zero values. What effect this has depends on the historic value but theoretically it could increase or decrease the DD value.

In the case where the mean is decayed throughout periods of inactivity it is reasonable to decay the DD similarly and a formula for this has been developed:

An approximate update formula is:

| For | DD | = X |
|-----|----|----|
|  | Historic value | = h |
|  | value(v) | = 0 |
|  | n | = 21 (e.g. 50) |
|  | giving (n − 1)/n | = 0.98 | and k is an iterator for the number of null usage periods.

$$X_k = 0.98^k X_0 + \left(\frac{1}{2n}\right)h^2 k(0.98^{k-1} + 0.97^{2(k-1)}) \quad [9]$$

This formula takes account of the decreasing historic value as they are decayed.

The following example illustrates the way in which the DD initially approaches the historic value and then tracks its decline with some lag.

If a given account has a historic value of 100 and DD of 20.

We have:

x=100

X=400 (DD squared: DD=20)

n=50 (as previous example)

TABLE 1

Example of DD progression

After n null usage periods

| N | x | X | DD |
|---|-----|---------|-------|
| 0 | 100 | 400 | 20 |
| 3 | 91.27 | 930.18 | 30.50 |
| 10 | 73.7 | 1738.53 | 41.69 |
| 20 | 54.3 | 2258.08 | 47.52 |

TABLE 1-continued

Example of DD progression

After n null usage periods

| N | x | X | DD |
|---|------|---------|-------|
| 30 | 40.1 | 2400.76 | 49.00 |
| 31 | 38.9 | 2403.33 | 49.02 |

Using the standard single update formula:

$$X(31)=0.98X(30)+x^2/50=2352.75+30.26=2383.00(DD=48.82)$$

Thus the DD is not reduced as expected using the inactivity update formula, since the historic value is now smaller than the DD, but begins to reduce from this point:

$$X(40)=2369.22(DD=48.67)x=29.57$$

$$X(50)=2256.38(DD=47.50)x=21.8$$

Thus the DD does track the decay of the Historic Profile value but with some lag and with a reduced rate of decay. However, since the DD behaviour is undefined for this type of situation the result can be regarded as reasonable. The simplifying assumptions mean that the precise DD behaviour is not observed. As shown in the example, the precise point at which the DD begins to show a decrease is skewed. However, this introduces a small element of inertia into the DD calculation during periods of inactivity which is regarded as a benefit.

The update formula for null periods can be expressed more generally as:

$$X_k = \left(\frac{n-1}{n}\right)X + \left(\frac{1}{2n}\right)h^2 k\left(\left(\frac{n-1}{n}\right)^{k-1} + (1-d)2^{(k-1)}\right) \quad [10]$$

This can be expressed more concisely as shown in equation [11]:

$$X_k = aX + bh^2 k(a^{k-1} + D^{2(k-1)}) \quad [11]$$

where a=(n−1)/n b=1/2n

D=(1−d)

These can be used to monitor the degree of variation and precisely quantify this. This allows a precise measurement of anomaly for an individual event. This may need to be assessed alongside other events.

Anomaly detection for event streams can be achieved by building up profiles of entities within the event stream. Examples of entities are telephone or network users, switches in telephone networks and servers in data networks. These events are represented in Event Data Packets and profiles of behaviour for the behaviour of these entities can be constructed. The typical behaviour of the entity is stored in one profile, the Historic Profile, and the recent behaviour is stored in another profile, the Recent Profile.

Using the methods outlined previously (in DDPatent.doc) the Recent Profiles are accumulated and Historic Profiles are updated once the latest Recent Profile is completed. At this point, upon completion of the Recent Profile, the DD values are used to assess the degree of anomaly of each element in the profile. This is done by comparing the Recent Profile values with Historic Profile values to calculate the difference and then comparing this with the DD value. The assessment of anomaly then depends upon the threshold set. If the threshold is set at, for instance, 5 times the DD, then any differences that are greater than this are considered to be anomalies. The DD value is then updated with the new profile values.

In an example where the EDPs are Call Detail Records (CDRs):

TABLE 2

Voice telephony recent and historic profile with DD.

|  | Calls | National (duration) | Data (duration) |
|---|---|---|---|
| Recent Profile | 3.0 | 90 | 120 |
| Historic Profile | 3.5 | 360 | 78 |
| Absolute Difference (Historic − Recent) | 0.5 | 290 | 42 |
| DD | 4.2 | 75 | 108 |

The difference can be compared with the DD values by forming a ratio. In the cases of 'Calls' and 'Data', the ratio here is well within the bounds of the threshold but for 'National' it is quite large and would be considered anomalous in some circumstances.

Calls: 0.5/4.2=0.119
National: 290/75=3.87
Data: 42/108=0.389

If the threshold is set at 5 times the DD then the National record is not anomalous but if a more restrictive value of 3 had been used then this would have counted as an anomaly. This procedure is analogous to the standard methods using standard deviations.

After the assessment the historic value and the DD are updated with the recent value as outlined elsewhere.

$$Eg.\ X' = X + ((v-x)^2 - X)/n$$

If we let the decayrate=0.03, then n=46 and X is the squared DD.
Calls: $X' = 4.2^2 + ((0.5)^2 - X)/46 = 17.26$
Taking the square root gives:
DD=4.15

TABLE 3

Voice telephony - updated values for the historic and DD records.

|  | Calls | National (duration) | Data (duration) |
|---|---|---|---|
| Recent Profile |  |  |  |
| Historic Profile | 3.485 | 351.9 | 79.26 |
| DD | 4.15 | 75 or (85.6) | 107.0 |

In the case illustrated the decision whether or not to update the National value depends on the threshold chosen for anomaly. If a threshold of 5 is used then the value should be updated. If the threshold is 3 then this would be an anomalous value and updating would be optional depending on the circumstance.

The derivation of the formulae assumes a constant update period. In effect this means the DD is only updated when the recent profile is completed. The question arises whether the DD can be used with partial profiles. An example of this situation is:

TABLE 4

Voice telephony - partial profile with historic profile and DD.

|  | Calls | National (duration) | Data (duration) |
|---|---|---|---|
| Partial Profile | 2 | 102 | 10 |
| Historic Profile | 3.5 | 360 | 78 |
| Absolute Difference (Historic − Partial Recent) | 1.5 | 248 | 68 |
| DD | 4.2 | 75 | 108 |

In this case the partial values can be expected to be lower than the historic values and the direct comparison is not a true comparison. However, if the partial values are expressed in terms of behaviour densities (Patent 10393 ID: BUTCHART, K) then comparisons can be made.

If the standard profile period is 4 hours for instance and the partial profile represents a poll occurring after one hour then the values can all be converted into per minute values, for example.

TABLE 5

Voice telephony - profiles and DD expressed as behaviour densities

|  | Calls | National (duration) | Data (duration) |
|---|---|---|---|
| Partial Profile | 0.033 | 1.7 | 0.167 |
| Historic Profile | 0.015 | 1.5 | 0.325 |
| Absolute Difference Historic − Partial Recent | 0.018 | 0.2 | 0.158 |
| DD | 0.0175 | 0.3125 | 0.45 |

The ratios of Difference to DD are:

| Calls: | 0.018/0.0175 = 1.029 |
| National | 0.2/0.3125 = 0.64 |
| Data: | 0.158/0.45 = 0.351 |

Thus all the values in this example are well within the normal variation.

This method of using behaviour densities does therefore allow partial profiles to be assessed for anomaly. This allows the anomalies to be detected much more quickly and action to be taken if appropriate. There will need to be a minimal period specified however. As the partial profile period reduces to values below, for instance, one tenth of the complete period, the effectiveness of the procedure may be reduced. Nevertheless, the invention offers the potential for a real-time anomaly detection measurement for applications such as telephony voice fraud where a significant period of usage must occur anyway as the fraudulent activity is taking place.

The invention is applicable to any form of episodic or time-dependent data where an average value for a given period is maintained by updating the existing average with a proportion of the new value. It is envisaged that the invention will be used with Event Data Packets which represent events associated with particular users, such as individual subscribers, data network users, telephony switches or network servers. Profiles of behaviour are generated and the comparison of the recent and historic behaviour for anomaly is made using the DD as outlined.

This can be most easily explained by considering the case of a profile when it enters a period of inactivity and null valued recent profile elements are presented. In this case the update formula is as shown in equation [10].

$$HP'=HP+\text{decayrate}(RP-HP) \quad [9]$$

If RP is set to zero this becomes as shown in equation [11]:

$$HP'=HP(1-\text{decayrate}) \quad [10]$$

After k periods of zero RP values the value is as given by equation [12]:

$$HP'=HP(1-\text{decayrate})^k \quad [11]$$

Thus the HP value exhibits exponential decay, since 0<decayrate<1. The half-life of the HP is reached when $(1-\text{decayrate})^k=0.5$.

When the profiles are being constantly updated the influence of each new value also follows the same exponential path. Its influence is greatest initially and then declines in an identical fashion so that by the time the half-life has been reached its contribution has declined to one half of its original contribution. The overall profile is obtained by summation of all these exponential decay paths. Each path however, although having the same shape, will not have the same scale, since they will each start at a value obtained from the Recent Profiles.

The invention has applications in voice fraud telephony where the detection of anomalies can be used as an indicator for potentially fraudulent activity and in data intrusion systems where the detection of anomalies can be used as an indicator of potential intrusion or misuse of the data network. The invention can potentially be used for any anomaly analysis of temporal data streams where large amounts of data are monitored and storage of previous values to obtain standard statistical values is prohibitive.

Figure 5:
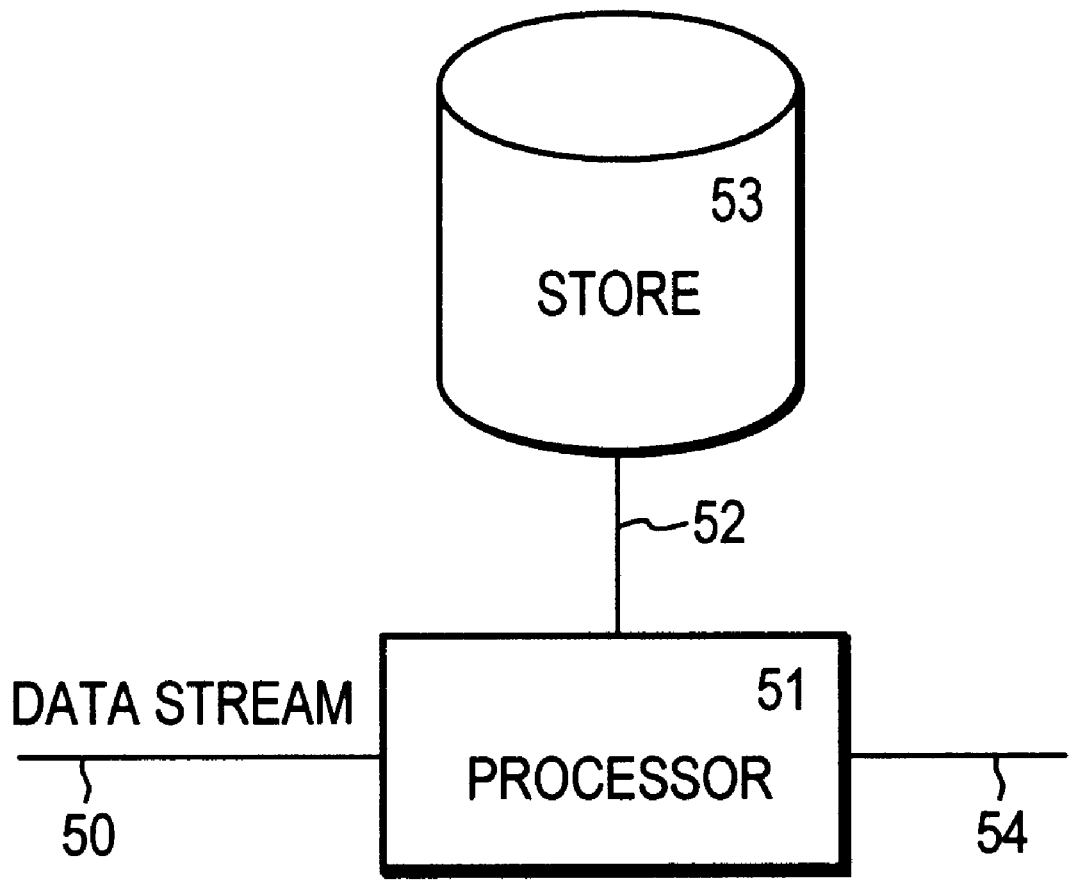
FIG. 5 shows a block diagram of an example of apparatus arranged in accordance with the present invention.

Referring now to FIG. 5, there is shown a block diagram of apparatus arranged in accordance with the invention. A data stream 50 is provided to a processor 51 arranged to process the data stream as previously described. Processing is performed with reference to previously stored values, stored on a suitable storage medium 53, so as to output 54 new weighted average and deviation values. These will normally be stored 53 to become the "previously stored values" of subsequent iterations.

Any range or device value given herein may be extended or altered without losing the effect sought, as will be apparent to the skilled person for an understanding of the teachings herein.

What is claimed is:

1. A method of detecting anomalies in a stream of data, the method comprising:
   receiving a data value on said stream of data;
   calculating a new weighted average responsive to said data value, a previously stored weighted average associated with said stream of data, and a decay rate in the range of 0 to 1;
   calculating a new measure of deviation from said new weighted average responsive to said new weighted average, said data value, a previously stored measure of deviation associated with said stream of data, and said decay rate; and,
   storing said new weighted average and said new measure of deviation,
   where said decay rate has a half-life and said new measure of deviation is calculated responsive to an approximation to said half-life.

2. A method according to claim 1 additionally comprising:
   determining an anomaly threshold responsive to said previously stored weighted average and a previously stored measure of deviation;
   deciding whether said data value is anomalous responsive to a comparison between said data value and said anomaly threshold.

3. A method according to claim 2 where said anomaly threshold is a sum of said previously stored weighted average and a multiple of said previously stored measure of deviation therefrom.

4. A method according to claim 3 wherein said multiple is in the range 2 to 10.

5. A method according to claim 1 wherein said new weighted average is a sum of a product of said decay rate and said data value and a product of one minus said decay rate and said previously stored weighted average.

6. A method according to claim 1 wherein said half-life is determined by $(1-d)^\lambda=0.5$ wherein d is said decay rate and $\lambda$ is said half life.

7. A method according to claim 1 wherein said new measure of deviation is $$DV + \left( \frac{(v-h)^2 - DV}{2 \cdot \lambda} \right)$$

wherein DV is said previously stored measure of deviation, v is said data value, h is said new weighted average, and $\lambda$ is said half life.

8. A method according to claim 1 wherein said decay rate is less than 0.1.

9. A method according to claim 2 wherein said data value relates to usage of a subscriber account.

10. A method according to claim 2 wherein an anomalous data value is indicative of account usage fraud.

11. A method according to claim 9 wherein said subscriber account is a telecommunications network subscriber account.

12. A method according to claim 11 wherein said telecommunications network subscriber account is associated with a wireless network.

13. A method according to claim 1 wherein successive data values relate to uniform-length time periods.

14. A method according to claim 1 wherein successive data values relate to non-uniform-length time periods.

15. A method according to claim 14 wherein said new weighted average and said new measure of deviation are calculated responsive to a measure of a time period associated with said data value.

16. A system for detecting anomalies in a stream of data, comprising:
   a processor arranged to receive a data value from said stream of data; to calculate a new weighted average responsive to said data value, a previously stored weighted average associated with said stream of data, and a decay rate in the range 0 to 1; and to calculate a new measure of deviation from said new weighted average responsive to said new weighted average, said data value, a previously stored measure of deviation associated with said streams of data, and said decay rate, where said decay rate has a half-life and said new measure of deviation is calculated responsive to an approximation to said half-life; and a storage device upon which to store said previously stored weighted averaged and said previously stored measure of deviation.

17. A telecommunications system comprising a system for detecting anomalies according to claim 16.

18. A wireless telecommunications system comprising a system for detecting anomalies according to claim 16.

19. A program for a computer on a machine-readable medium arranged to perform the steps of:

receiving a data value on a stream of data;

calculating a new weighted average responsive to said data value, a previously stored weighted average associated with said stream of data, and a decay rate in the range of 0 to 1; and calculating a new measure of deviation from said new weighted average responsive to said new weighted average, said data value, a previously stored measure of deviation associated with said stream of data, and said decay rate, where said decay rate has a half-life and said new measure of deviation is calculated responsive to an approximation to said half-life.

* * * * *